(12) United States Patent
Kondo et al.

(10) Patent No.: US 6,668,124 B2
(45) Date of Patent: Dec. 23, 2003

(54) OPTICAL FIBER WIRING BOARD

(75) Inventors: Katsuaki Kondo, Itami (JP); Kazuo Imamura, Itami (JP); Minoru Yoshida, Itami (JP)

(73) Assignee: Mitsubishi Cable Industries, Ltd., Hyogo (JP)

( * ) Notice: Subject to any disclaimer, the term of this patent is extended or adjusted under 35 U.S.C. 154(b) by 122 days.

(21) Appl. No.: 10/058,033

(22) Filed: Jan. 29, 2002

(65) Prior Publication Data

US 2002/0102088 A1 Aug. 1, 2002

(30) Foreign Application Priority Data

Jan. 29, 2001 (JP) .................................. P. 2001-019395

(51) Int. Cl.[7] .................................................. G02B 6/00
(52) U.S. Cl. ....................................................... 385/134
(58) Field of Search .......................... 385/14, 129, 130, 385/131, 134, 135, 136, 137

(56) References Cited

U.S. PATENT DOCUMENTS 4,761,052 A * 8/1988 Buekers et al. ............. 385/135
4,858,075 A * 8/1989 Butterworth ................ 361/739
5,155,785 A * 10/1992 Holland et al. .............. 385/89

* cited by examiner

Primary Examiner—Lynn Feild
Assistant Examiner—Phuong K T Dinh
(74) Attorney, Agent, or Firm—Sughrue Mion, PLLC (57) ABSTRACT

An optical fiber board has a substrate 2, optical fibers arranged as wiring on the substrate 2, and extension portions 10 in which the optical fibers are led out from the substrate. The optical fibers in the extension portions 10 are covered with protective tubes 5 for protecting the optical fibers. One end portion 51 of each of the protective tubes 5 is attached to corresponding ones of notch portions 4 provided in an end edge portion of the substrate 2 from which the optical fibers are extended out.

11 Claims, 8 Drawing Sheets

OPTICAL FIBER WIRING BOARD

BACKGROUND OF THE INVENTION

1. Field of the Invention

The present invention relates to an optical fiber wiring board for optically connecting optical elements, optical circuits or optical devices to each other.

2. Description of the Related Art

Improvement of transmission rate has been intended in the inside of communication apparatus and computers in recent years. Examination of optical interconnection substituted for electric wiring heretofore used has been advanced for high-rate transmission. At present, a proposal has been made on an optical fiber wiring board in which a large number of optical fibers are arranged as wiring in a backboard or in a plug-in unit so as to be integrated into the form of a board. Such an optical fiber wiring board generally is formed as follows: A large number of optical fibers are arranged as wiring on a sheet-like substrate provided with an adhesive layer. Then, at least one optical fiber is led out at a predetermined position from an edge portion of the substrate. When a plurality of optical fibers are led out at the predetermined position, they are led out in a condition that they are horizontally arranged in a row. Finally, connectors are attached to the ends of the optical fibers thus led out.

As a structure of leading out the optical fibers, a following configuration has been disclosed in Japanese Patent No. 2574611. That is, tab portions in form of protrusion portions are provided on optical fiber leading-out portions of the substrate so that optical fibers are extended out along the tab portions. In this configuration, the optical fiber leading-out portions can be mechanically reinforced with the tab portions. Moreover, the optical fibers extended out from the substrate can be pulled around when the tab portions are curved in a direction vertical to the plane of the substrate or twisted. Therefore, there is an advantage that degree of freedom in points of connection of connectors is increased.

In the configuration, the degree of freedom for curving the tab portions in a direction vertical to the plane of the substrate is obtainable. However, the tab portions cannot be curved in a left-right direction with respect to a direction in which the tab portions are protruded out from the substrate because the tab portions protruded out from the substrate are formed integrally with the substrate. There is a disadvantage that the degree of freedom is limited when optical fibers are pulled around from the optical fiber leading-out portion in a direction horizontal to the plane of the substrate and connected by connectors connected there to. It may be therefore considered that extension portions are constituted by optical fibers which are simply led out from the substrate without provision of any tab portion. If such extension portions are pulled around for connection of connectors, excessive bending is, however, applied on the optical fibers to thereby bring about a problem in increase of loss or damage of the optical fibers.

SUMMARY OF THE INVENTION

Therefore, an object of the invention is to provide an optical fiber wiring board having an optical fiber leading-out structure in which a bundle of optical fibers led out from a substrate can be pulled around freely in a direction horizontal to the plane of the substrate as well as in a direction vertical to the plane of the substrate, and in which the optical fibers extended out from the substrate can be mechanically reinforced sufficiently.

In order to accomplish the object above, the following means are adopted. According to the invention, there is provided an optical fiber wiring board comprising: a substrate; a plurality of optical fibers arranged as wiring on the substrate; a extension portion including a base portion having a predetermined length from an edge portion of the substrate, and a forwarding end portion connected to a side of the base portion opposing the substrate wherein the extension portion also includes at least one optical fiber; a protective tube protecting the optical fiber in the extension portion; and a lock portion provided in the edge portion of the substrate for locking one end portion of the protective tube relative to the substrate.

In the optical fiber wiring board, one optical fiber may be led out in the extension portion or a plurality of optical fibers may be led out in the extension portion. In the case of a plurality of optical fibers contained in the extension portion, the optical fibers are preferably led out horizontally closely to one another in a row so that the adjacent optical fibers are integrated with each other over the whole or partial length of the optical fibers in the extension portion.

In the configuration, a bundle of optical fibers can be curved freely in the extension portion because a holding body such as the tab portion integrated with the substrate is not attached to the optical fibers led out. Accordingly, the optical fibers led out from the substrate can be pulled around freely in directions horizontal and oblique to the plane of the substrate as well as in a direction vertical to the plane of the substrate. In addition, because the optical fibers in the extension portion are covered with the protective tube, the optical fibers can be protected from bending stress or damage due to pulling around of the optical fibers for connection of connectors so that the mechanical strength of the extension portion is reinforced.

When a plurality of optical fibers are led out in one extension portion, the optical fibers may be led out horizontally closely to one another in a row so that the adjacent optical fibers are integrated with one another over the whole or partial length of the optical fibers in the extension portion. In this case, a bundle of optical fibers led out is wholly or partly fixed integrally, for example, to form a tape-like shape. Therefore, the bundle of the optical fibers is not separated into pieces. Moreover, the state of arrangement of the optical fibers in the portion in which the optical fibers are led out from the substrate is not disordered. Further, the portion fixed integrally may be limited to a forward end portion of the optical fibers led out so that a base portion of the optical fibers can be made free. In this case, the degree of freedom for curving can be preferably kept in the base portion.

In the above-mentioned optical fiber wiring board, it is preferable that the lock portion includes notch portions formed at portions in the substrate, between which the optical fiber is extended out from the edge portion of the substrate, wherein the one end portion of the protective tube is fitted and locked to the notch portions. In such a lock structure, there is required only a simple operation that one end of each of the protective tubes put on the optical fibers in the extension portions is attached to corresponding ones of notch portions formed in the substrate before the connectors are attached. Hence, there is an advantage that workability is excellent.

A heat-shrinkable tube is preferably used as the protective tube. In this case, the heat-shrinkable tube may be heat-shrunk after one end portion of the heat-shrinkable tube is fitted into the lock portion of the substrate. After heat shrinking, the tube is made thin in the portion locked to the substrate. Hence, a level difference between the tube and the substrate is reduced. Moreover, the adhesive property between the inside of the tube and the substrate/optical fiber is made good. Hence, tolerance to dropout is preferably improved.

Further, the above-mentioned optical fiber wiring board, preferably, further comprising: a loose tube protecting the optical fiber in the extension portion, wherein the loose tube is covered with the protective tube. In the optical fiber wiring board, the protective tube may cover integrally a plurality of loose tubes each protecting the optical fiber in each of the extension portions.

DETAILED DESCRIPTION OF THE INVENTION

Embodiments of the invention will be described below with reference to the drawings.

Figure 1:
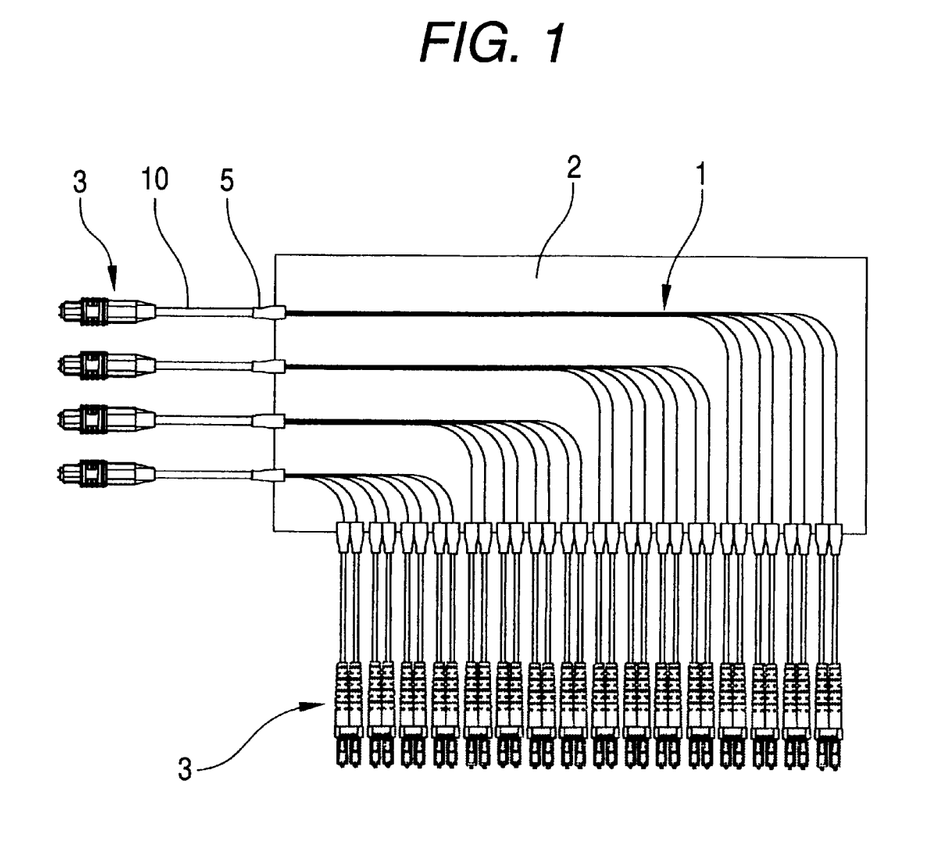
FIG. 1 is a plan view showing an example of an optical fiber wiring board.

FIG. 1 is a plan view showing an optical fiber wiring board according to an embodiment of the invention. A large number of optical fibers 1 formed as a desired pattern are bonded/fixed onto a substrate 2. End portions of the optical fibers 1 are led out one by one or bundle by bundle from the substrate 2. The portions in which the optical fibers 1 are led out from the substrate 2 form extension portions 10. Incidentally, connectors 3 are attached to end portions of the extension portions 10 of the optical fibers respectively. The connectors 3 are provided to be connected to connectors connected to an equipment to be mounted (hereinafter referred as equipment-side connectors) respectively when the optical fiber wiring board is mounted on the equipment. In such an optical fiber wiring board, the invention has a feature that base portions of the extension portions 10 of the optical fibers are covered with protective tubes 5 respectively.

Figure 2:
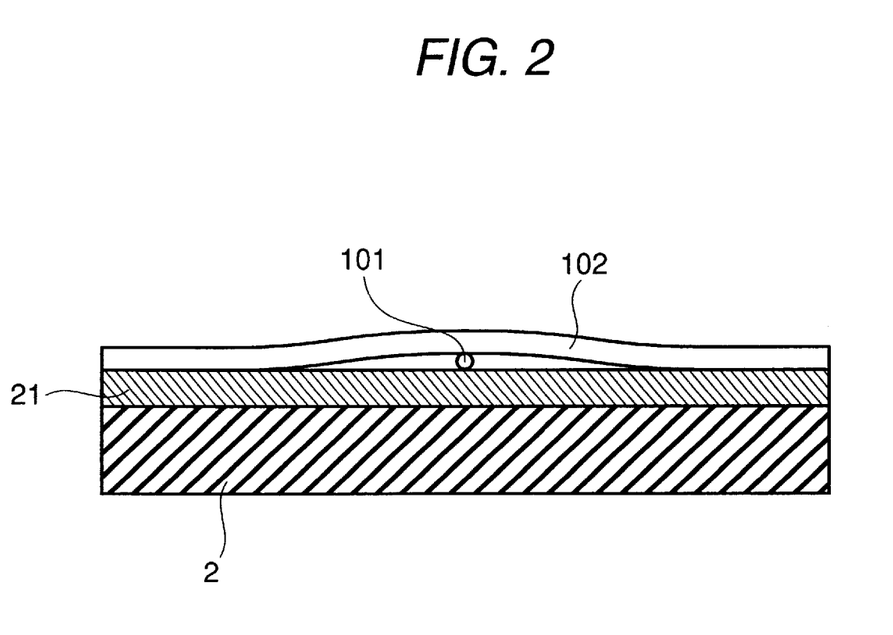
FIG. 2 is a sectional view showing a portion of intersection between optical fibers in the optical fiber wiring board according to the invention.

FIG. 2 is an enlarged sectional view showing a state of adhesion between each optical fiber 1 and the substrate 2. To describe it in detail, optical fibers 101 and 102 are arranged as wiring on an adhesive layer 21 which is provided on the substrate 2 made of a resin sheet. Incidentally, FIG. 2 shows a portion of intersection between optical fibers arranged as wiring and shows a state in which one optical fiber 102 is laid across the other optical fiber 101. In such a configuration, a material strongly tolerant to vibration may be preferably used as the substrate 2 so that optical fibers laid thereon are hardly bent. For example, a resin sheet made of a polyimide resin, a polyethylene terephthalate resin, a polyethylene naphthalate resin and so on can be used as the substrate 2. Any material may be used as the adhesive layer 21 if the material has bonding or adhesive property sufficient to fix optical fibers steadily. For example, the adhesive layer 21 can be made of a silicone adhesive agent.

For example, an optical fiber wiring board is produced by a following method. That is, a wiring apparatus provided with a wiring head having an optical fiber supply unit is used. An optical fiber is paid out from the head onto the substrate 2 so that a predetermined pattern is drawn while the optical fiber is bonded to the adhesive layer 21. The optical fiber is laid into a form as if the form is drawn with a single stroke of a pen, via routes protruded out from edges of the substrate 2. Then, the optical fiber is cut at portions protruded out from the substrate 2, so that the extension portions 10 of optical fibers are formed. Finally, connectors 3 are then attached to end portions of the extension portions 10 respectively, so that the optical fiber wiring board is completed. In the invention, the protective tubes 5 are provided in the extension portions 10 respectively.

Figure 3:
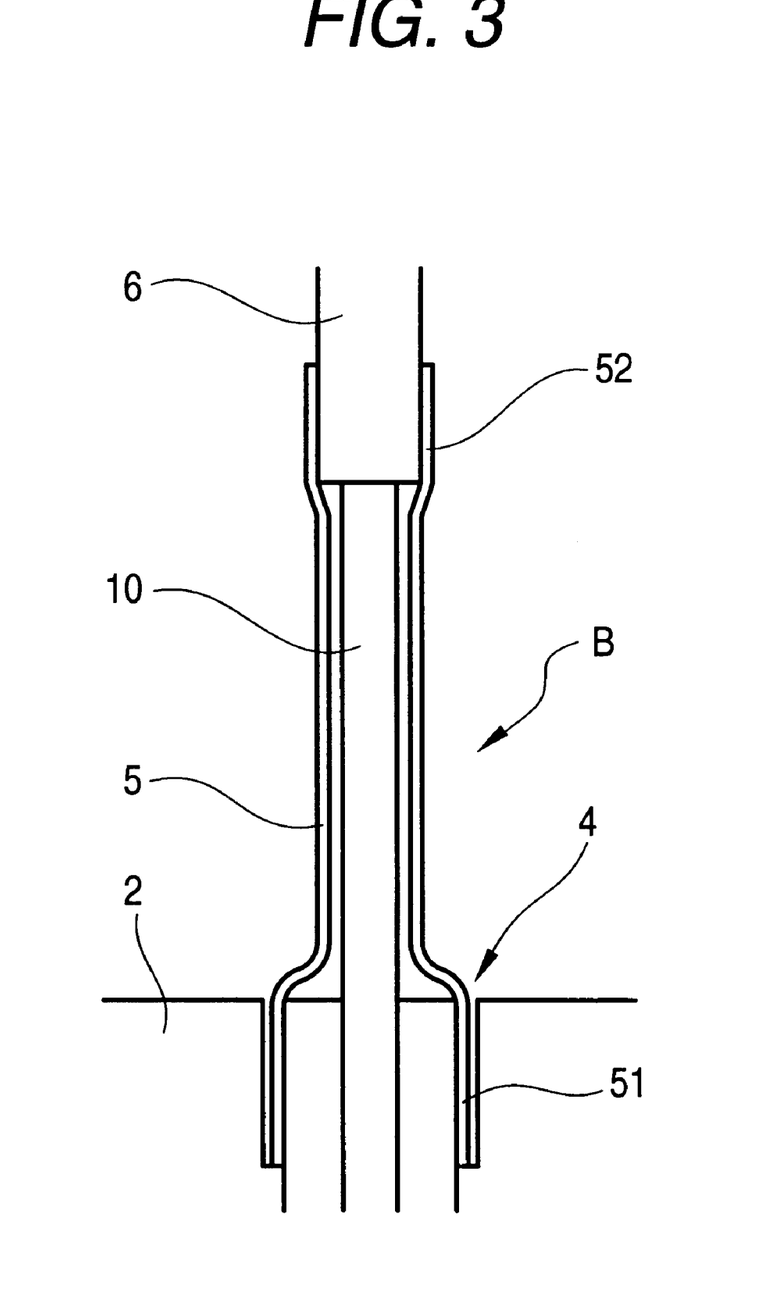
FIG. 3 is a partly sectional enlarged plan view showing important part of an optical fiber extension portion where one optical fiber is extended in an optical fiber wiring board according to the invention.

FIG. 3 is an enlarged view showing an embodiment of the extension portion 10 in the invention. FIG. 3 shows the case where one optical fiber per port is led out from the substrate 2 and where a skin layer 6, for example, constituted by a Kebler and a coating layer, is provided on the portion other than the base portion B of the extension portion 10. In this embodiment, the substrate 2 has notch portions 4 which are located in opposite side portions between which the optical fiber is extended out from the edge portion of the substrate 2. One end portion 51 of each of the protective tubes 5 is fitted and locked to corresponding ones of notch portions 4. An end portion side of the skin layer 6 is covered with the other end portion 52 of the protective tube 5 so that the protective tube 5 is laid over the end portion side of the skin layer 6. According to this embodiment, work ability is good because there is no need but a simple operation in which one end of the protective tube put on the optical fiber in the extension portion is fitted into the notch portions 4 of the substrate before a connector 3 is attached.

Figure 4:
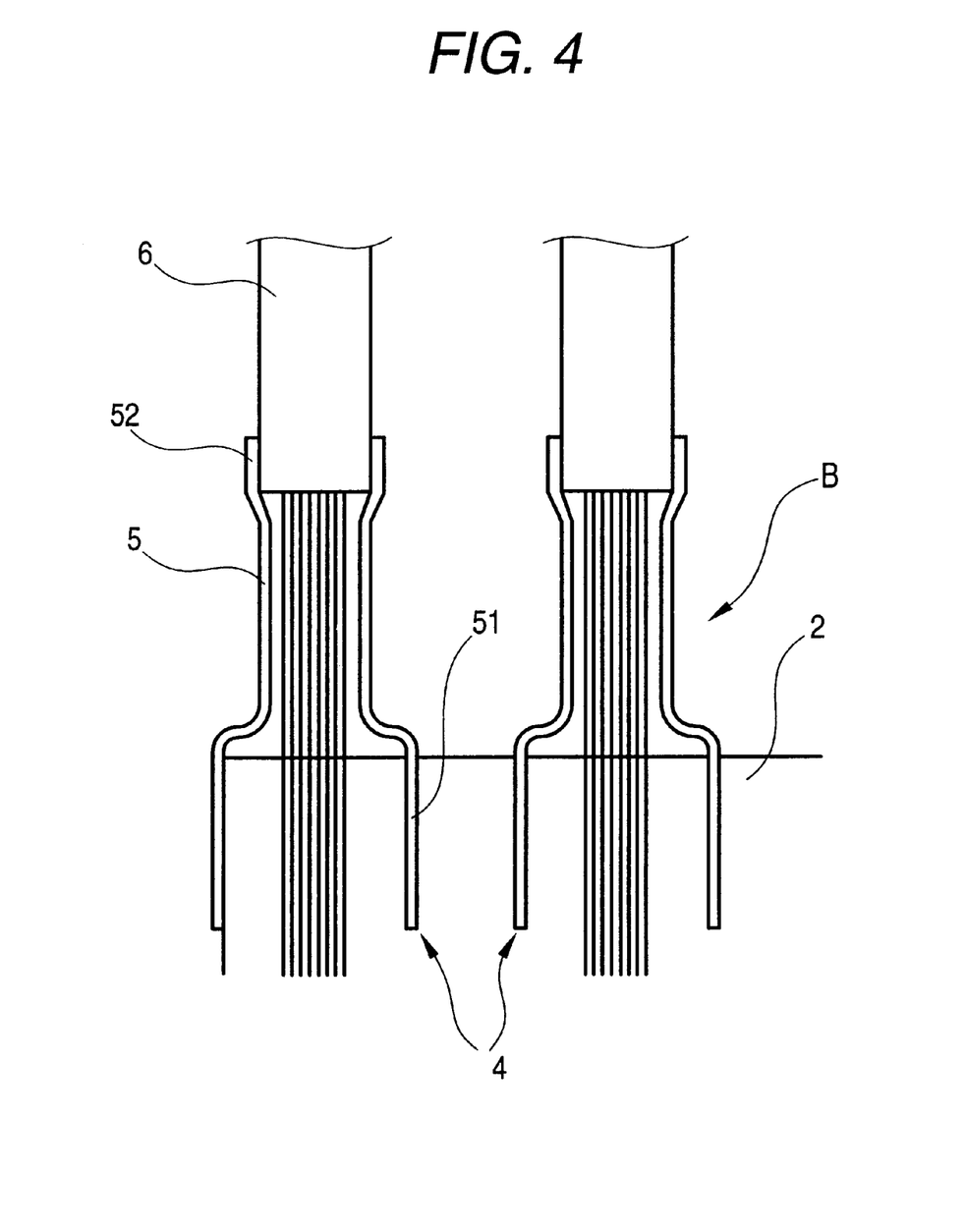
FIG. 4 is a partly sectional enlarged plan view showing important part of an optical fiber extension portion where a plurality of optical fibers are extended in an optical fiber wiring board according to the invention.

FIG. 4 is an enlarged view showing another embodiment of the extension portion 10 in the invention. A plurality of optical fibers per port are led out from the substrate 2. The optical fibers are arranged horizontally closely to one another in a row. A skin layer 6 is provided on the portion other than the base portion B of the extension portion 10 in the same manner as described above. Also in this embodiment, the substrate 2 has notch portions 4 which are located in opposite side portions between which the plurality of optical fibers are extended out from the edge portion of the substrate 2. One end portion 51 of the protective tube 5 is fitted and locked to corresponding ones of notch portions 4. An end portion side of the skin layer 6 is covered with the other end portion 52 of the protective tube 5 so that the protective tube 5 is laid over the end portion side of the skin layer 6. It does not means that a mode in which the optical fibers are led out, for example, in two rows horizontally is excluded or a mode in which the optical fibers are led out closely to one another is excluded. The arrangement where optical fibers are horizontally arranged closely to one another in a row is, however, preferred from the point of view of workability of attachment of connectors and space saving, and from the point of view of efficiency in integrally fixing optical fibers in one another as will be described layer.

Any one of various methods can be used as a method for protecting the base portion B. Examples of the method used in the invention include: a method of coating the base portion B with an elastic rubber or gel member formed in a tube-like shape; and a method of winding the base portion B with a tape loosely. A method of loosely putting a protective tube on optical fibers at the base portion B is, however, preferred from the point of view of excellent workability of attachment without limitation on free relative movement of optical fibers at the base portion B as much as possible.

Examples of the protective tube 5 allowed to be used are various kinds of flexible tubes such as a heat-shrinkable tube, a rubber tube, a resin tube and a thin metal tube. Especially, the heat-shrinkable tube is preferred because it is tolerant to dropout as described above and because the portion locked to the substrate 2 can be made thin. For example, a polyolefin resin heat-shrinkable tube, a polyvinyl chloride resin heat-shrinkable tube, and a silicone resin heat-shrinkable tube can be used as the various kinds of tubes having heat-shrinkability. Although groove-like notch portions 4 are shown as lock portions provided in the end edge portion of the substrate 2, the invention is not limited thereto. For example, there may be used a method of providing a protruded portion on the substrate to thereby lock the tube or a method of heat-fusing the tube to the substrate as a heat seal.

When the force of leading out the protective tube is intended to be improved more greatly in the case where groove-like notch portions 4 shown in FIG. 3 are used as the lock portions, a structure may be used so that side walls of grooves of the notch portions 4 have unevenness surface such as the sawteeth. In this case, when a shrinkable tube is used as the protective tube 5, the tube is shrunk adhesively to the groove shaped like the sawteeth. Accordingly, tolerance to dropout is improved more greatly by the hooking effect of the groove shaped like the sawteeth. Such grooves can be machined by punching with a knife or laser machining.

Figure 5:
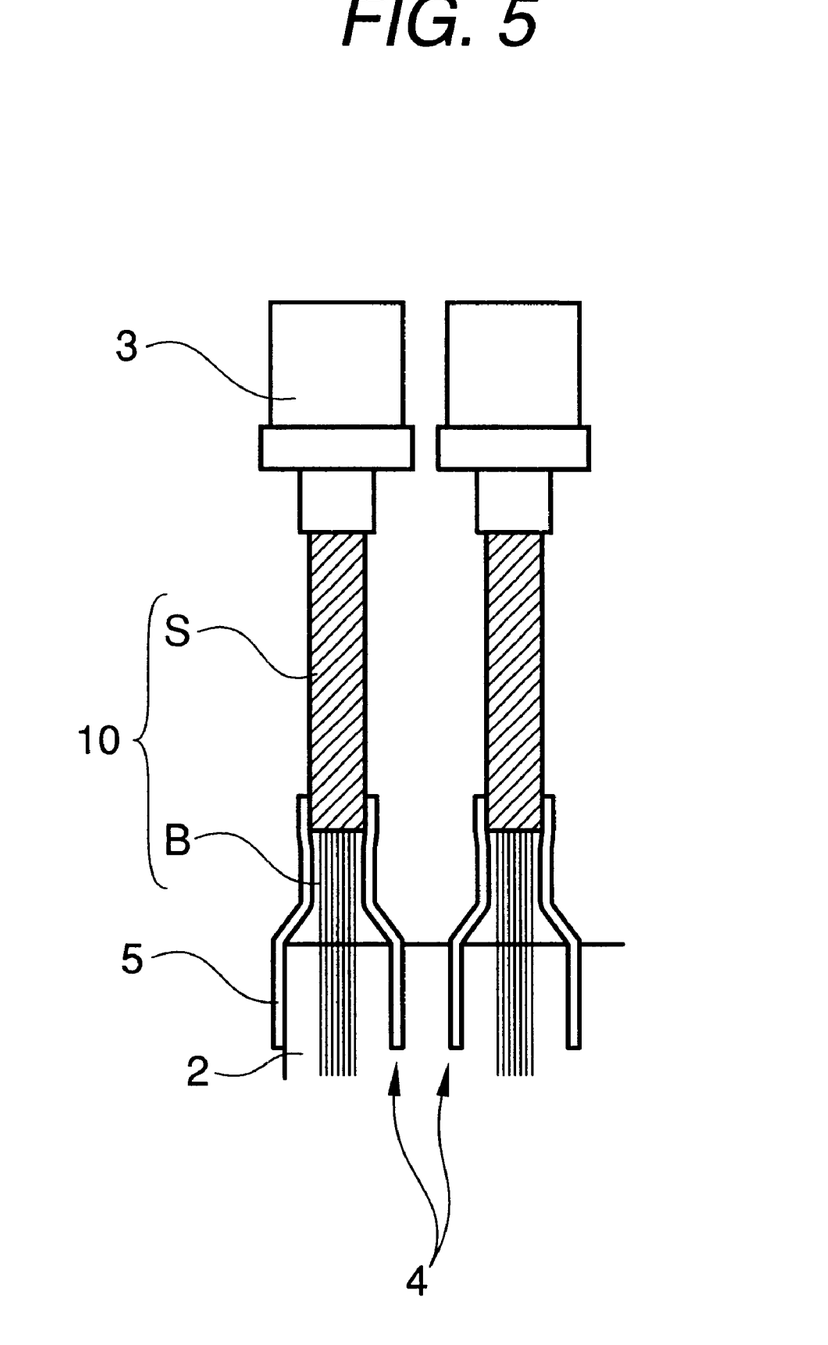
FIG. 5 is a partly sectional plan view showing another example of important part of an optical fiber extension portion in an optical fiber wiring board according to the invention.

FIG. 5 shows a preferred embodiment in the case where a plurality of optical fibers per port are led out from the substrate 2 and arranged horizontally closely to one another in a row. In this embodiment, adjacent optical fibers in a part of the optical fibers led out are integrated with each other. In the base portion B of the extension portion 10 of the optical fibers, adjacent optical fibers are not bonded/fixed to each other so that the optical fibers can move freely. On the other hand, in the forward end portion connected to a side the base portion B opposing the substrate, the optical fibers are fixed integrally with one another. Further, the protective tube 5 is put on the extension portion so as to be laid over an end portion of the forward end portion S.

In the configuration of the extension portion 10, the optical fibers led out can be pulled around freely in horizontal and vertical directions while the base portion B in a free state is used as a turning portion when the optical fibers are assembled with the optical fiber wiring board. On the other hand, the forward end portion S is provided to be fixed integrally, for example, to form a tape-like shape. Hence, the optical fibers are not separated into pieces. In addition, the arrangement state of the optical fibers in the portion in which the optical fibers are led out from the substrate 2 is not disordered. When, for example, a standard optical fiber having a cladding with an outer diameter of 125 $\mu$m and a coating layer with an outer diameter of 250 $\mu$m is used so that an extension portion 10 can be constituted by about 4 to 8 optical fibers, the length of the base portion B may be preferably selected to be in a range of from about 30 mm to about 150 mm, preferably about 50 mm.

The following method is preferably used as means for fixing adjacent optical fibers integrally at the forward end portion S. For example, an alignment jig is used so that a plurality of optical fibers can be horizontally arranged closely in a row. The periphery of the optical fiber bundle is fixed by an adhesive agent to thereby form a coating layer. This method is preferred because steady fixation can be achieved easily and because the finished bundle can be handled as easily as a core wire tape. As other methods, there may be used a method in which an adhesive tape is stuck to a bundle of optical fibers lined up to thereby integrate the optical fibers. There may be also used a method in which adhesive materials are provided on the bundle of optical fibers and then chemical reaction, heat or light irradiation are applied on the bundle of optical fibers so that optical fibers are bonded relative to one another directly.

Although the embodiment has shown the case where the optical fibers are integrated with one another in each forward end portion S, the invention may be applied also to the case where the optical fibers are integrated with one another all over the length of the extension portion 10 or except the intermediate portion of each extension portion 10 so that the integrated portion is covered with a protective tube. Further, a skin layer may be formed on each forward end portion S so that a portion between the skin layer and the end edge portion of the substrate 2 is covered with a protective tube 5. In this case, the protective tube 5 is preferably provided as a double layer structure having a first protective tube for protecting the substrate 2 side of the base portion B, and a second protective tube for covering the first protective tube and covering the exposed portion of the optical fibers reaching the skin layer.

Figure 6A:
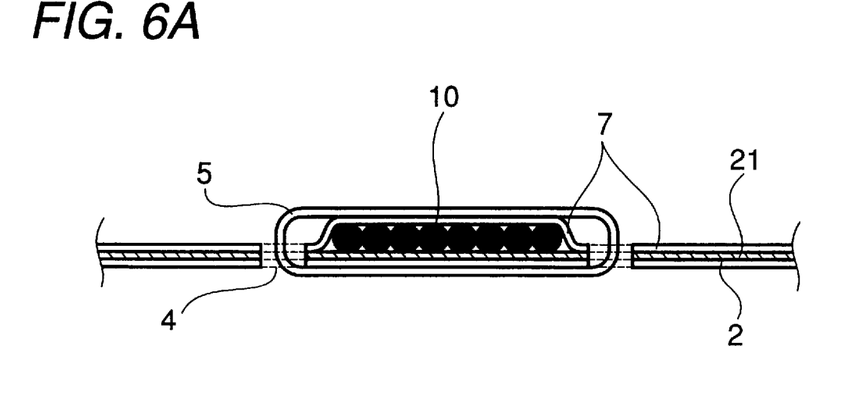
FIGS. 6A, 6B and 6C are sectional views showing optical fiber extension portions respectively.
Figure 6B:
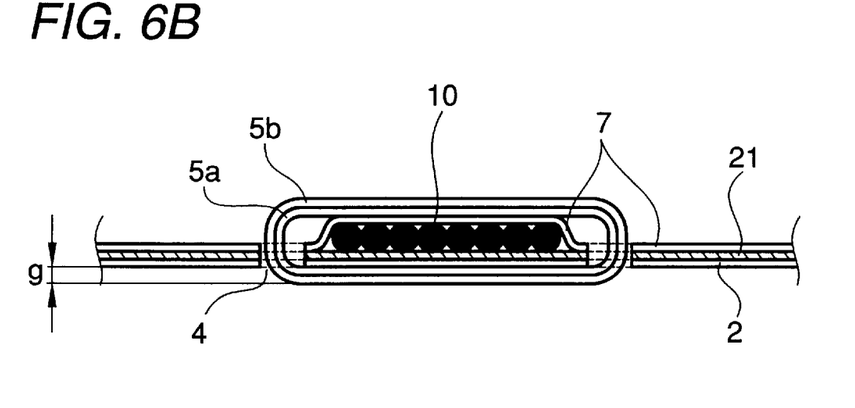
Figure 6C:
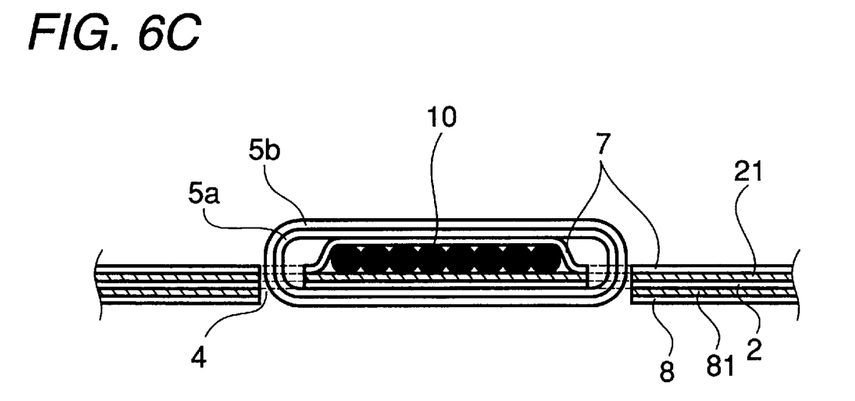

Incidentally, in the optical fiber wiring board as described in the invention, optical fibers arranged as wiring on the substrate 2 may be covered with a protective sheet for the double purposes of: preventing wiring from being disordered; and protecting the optical fibers from being damaged. FIGS. 6A to 6C show an embodiment in which such a protective sheet is provided. FIG. 6A is a sectional view showing the case where the protective sheet 7 is provided by lamination when the single-layer protective tube 5 as shown in FIG. 4 is provided. The whole front surface of the substrate 2 is covered with the protective sheet 7 except that the protective sheet 7 is notched in the notch portions 4 in the same manner as that in the substrate. The protective tube 5 is provided so that the substrate 2 and the protective sheet 7 in the extension portion 10 of optical fibers are wrapped in the protective tube 5. Alternatively, the protective sheet 7 may be attached to the substrate 2 after the extension portion 10 is covered with the protective tube 5, so that the notch portions 4 and the extension portion 10 can be covered with the protective sheet 7 from above.

FIG. 6B is a sectional view showing the case where the protective sheet 7 is provided when the double-layer protective tubes are provided. Also in this case, the protective sheet 7 can be provided in the same manner as described above. It is, however, inevitable that the protective tube portion is thick relative to the substrate 2 because the tube has a double-layer structure with first and second protective tubes 5a and 5b. For this reason, as shown in FIG. 6B, a level difference g between a portion with the extension portion 10 covered with the protective tube and the other portion becomes relatively large.

In the case where the generation of such a level difference g is to be avoided, that is, in the case where there is a fear of the disadvantage that workability is deteriorated by the presence of such a large level difference g because the level difference g is caught in the other portion when the optical fiber wiring board is incorporated in equipment, a height adjusting material 8 may be stuck to the rear surface of the substrate 2 through an adhesive layer 81 as shown in FIG. 6C so that the level difference g can be eliminated.

Figure 7A:
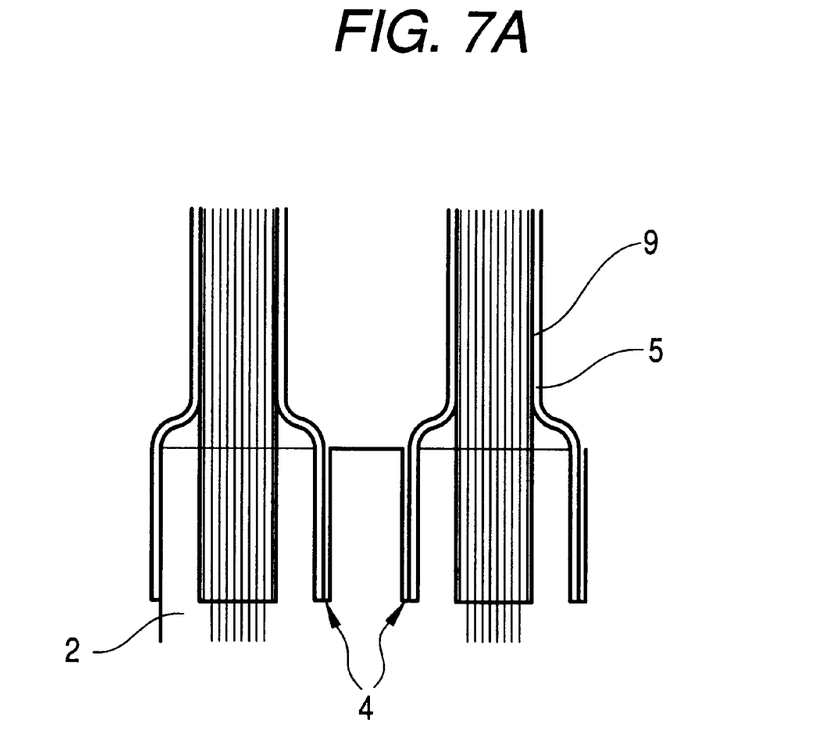
FIG. 7A is a partly sectional enlarged plane view showing important part of an optical fiber extension portion when a loose tube is provided.
Figure 7B:
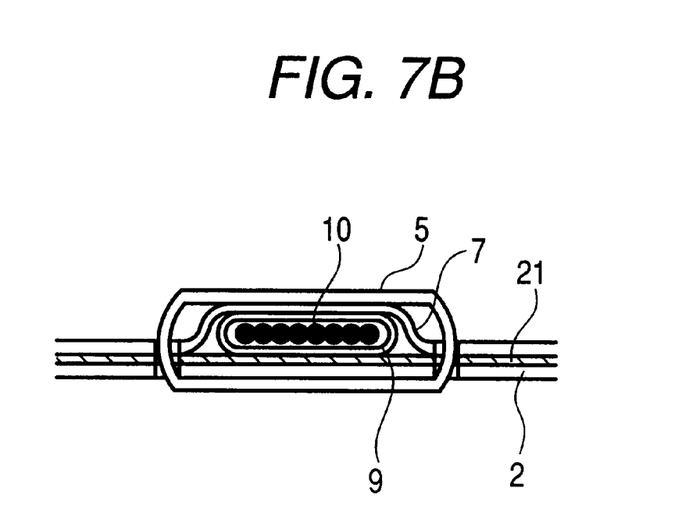
FIG. 7B is a sectional view showing important part of an optical fiber extension portion when a loose tube is provided.

The above-mentioned embodiments have shown the case where the optical fibers led out are covered directly with the protective tube. The base portion of optical fibers may be covered with a loose tube for protecting the optical fibers themselves before being covered with the protective tube. The loose tube covering the optical fibers is then covered with the protective tube. FIG. 7A is a partly sectional enlarged plane view showing important part of an optical fiber extension portion when the base portion of optical fibers is covered with a loose tube. The loose tube 9 covers the base portion of the optical fibers in the extension portion so that the optical fibers can be protected from damaging and be reinforced in the strength thereof. A protective tube 5 is provided to cover the loose tube 9 so that the optical fibers at the end edge portion of the substrate 2 can be reinforced. FIG. 7B is a sectional view showing the case where a protective sheet 7 is provided by lamination when the loose tube is provided as shown in FIG. 7A. The whole front surface of the substrate 2 is covered with the protective sheet 7 except that the protective sheet 7 is notched in the notch portions 4 in the same manner as that in the substrate. The loose tube 9 is provided so that the optical fibers in the extension portion 10 is wrapped in the loose tube 9 while the loose tube 9 is sandwiched between the substrate 2 and the protective sheet 7. That is, in the extension portion 10, the loose tube 9 is inserted into and sandwiched between the substrate 2 and the protective sheet 7 while the loose tube 9 is put on the bundle of the optical fibers. Then the protective tube 5 is provided so that the substrate 2, the protective sheet 7 and the loose tube 9 sandwiched between the substrate 2 and the protective sheet 7 are wrapped in the protective tube 5. Alternatively, the protective sheet 7 may be attached to the substrate 2 after the extension portion 10 is covered with the protective tube 5, so that the notch portions 4 and the extension portion 10 can be covered with the protective sheet 7 from above.

Figure 8:
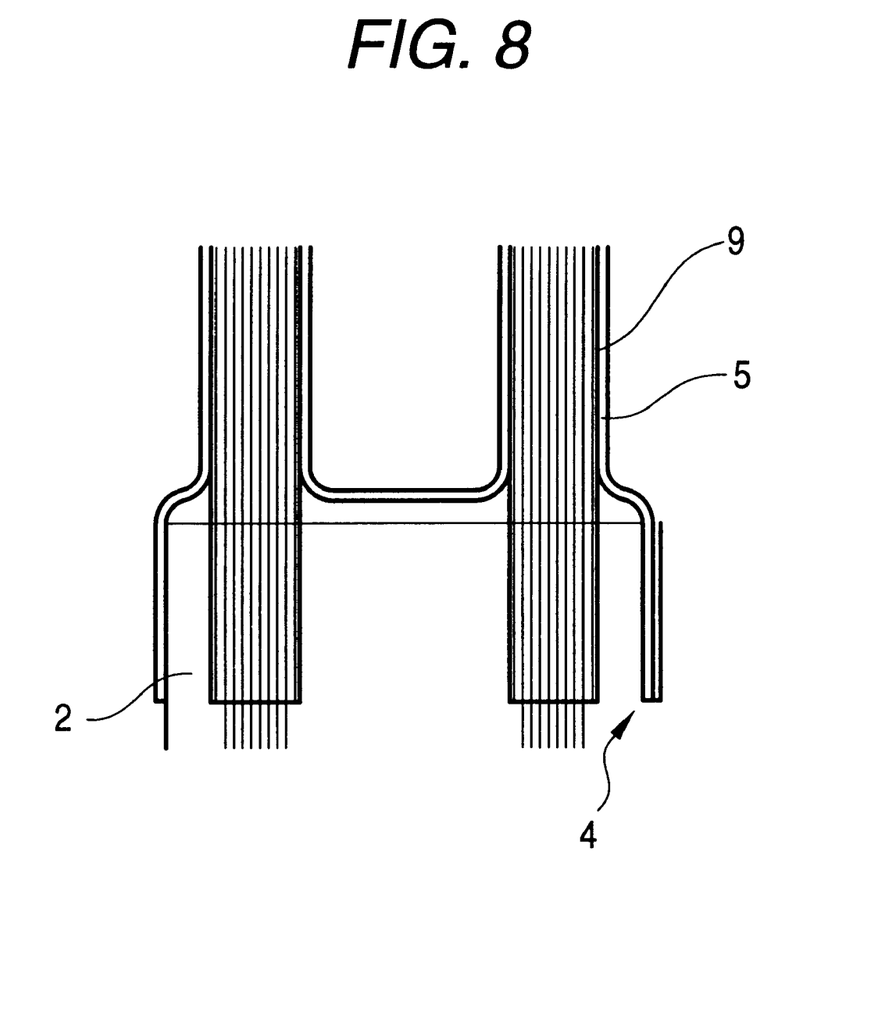
FIG. 8 is a partly sectional enlarged plane view showing important part of an optical fiber extension portion when a protective tube covers integrally the plurality of loose tubes.

The protective tube 5 may be provided as shown in FIG. 8 so that the protective tube 5 can cover integrally the plurality of the extension portions. In this case, for example, a rubber tube is used as the protective tube and attached to the end edge portion of the substrate 2 by heating-press. Although the protective tube 5 covers integrally the plurality of the extension portions where the loose tube is provided in FIG. 8, the protective tube 5 may be cover integrally the plurality of the extension portions where the optical fibers are not covered with the loose tube.

Besides the embodiments, the wiring form and the constituent materials of optical fibers can be selected suitably without departing from the gist of the invention. For example, the configuration in which the optical fiber wiring board is made fire-retardant as a whole by using fire-retardant materials as the substrate 2, the protective tube 5 and the protective sheet 7 is also a preferred embodiment.

As described above, in the optical fiber wiring board according to the invention, optical fibers led out from the substrate can be curved freely in a direction horizontal to the plane of the substrate as well as in a direction vertical to the plane of the substrate. Accordingly, the degree of freedom for pulling the optical fibers around can be increased when the optical fiber wiring board is incorporated in equipment and connected to the equipment by connectors. Hence, workability is excellent. Moreover, there is a merit that the degree of freedom for designing the equipment in which the optical fiber wiring board is incorporated is increased. In addition, the base portion of the optical fiber extension portion which is apt to be a mechanically weak point is covered with the protective tube so as to be reinforced. Hence, there is an excellent effect that tolerance to free pulling-around of the optical fibers can be guaranteed. Further, the optical fibers them selves are covered with the loose tube. Accordingly, the optical fibers themselves can be protected from damaging and reinforced in the strength thereof.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. An optical fiber wiring board comprising:
   a substrate;
   a plurality of optical fibers arranged as wiring on said substrate;
   an extension portion including a base portion having a predetermined length from an edge portion of said substrate, and a forwarding end portion connected to a side of the base portion opposing said substrate wherein the extension portion also includes at least one optical fiber;
   a protective tube protecting said optical fiber in said extension portion; and
   a lock portion provided in the edge portion of said substrate for locking one end portion of said protective tube relative to said substrate.

2. The optical fiber wiring board according to claim 1, wherein said extension portion includes a plurality of optical fibers disposed adjacent to one another.

3. The optical fiber wiring board according to claim 2, wherein said plurality of optical fibers in said extension portion are arranged horizontally closely to one another in a row and said adjacent optical fibers are integrated with each other over a whole or partial length of said plurality of optical fibers in said extension portion.

4. The optical fiber wiring board according to claim 1, wherein said extension portion includes one optical fiber.

5. The optical fiber wiring board according to claim 1, wherein said lock portion includes notch portions formed at portions in said substrate, between which said optical fiber is extended out from the edge portion of said substrate, wherein said one end portion of said protective tube is fitted and locked to the notch portions.

6. The optical fiber wiring board according to claim 5, wherein the notch portion has unevenness surface at side walls thereof.

7. The optical fiber wiring board according to claim 1, wherein said protective tube includes a heat-shrinkable tube.

8. The optical fiber wiring board according to claim 1, further comprising:
   an adhesive layer provided on said substrate.

9. The optical fiber wiring board according to claim 1, further comprising:

a loose tube protecting said optical fiber in said extension portion,
wherein said loose tube is covered with said protective tube.

10. The optical fiber wiring board according to claim 1, wherein said optical fiber wiring board comprises a plurality of extension portions each including said at least one optical fiber, and wherein said protective tube covers integrally said plurality of extension portions.

11. The optical fiber wiring board according to claim 8, wherein said optical fiber wiring board comprises a plurality of extension portions each including said at least one optical fiber, and wherein said protective tube covers integrally a plurality of loose tubes each protecting said optical fiber in each of said extension portions.

* * * * *